No. 856,832.    PATENTED JUNE 11, 1907.
A. L. ANDERSON.
FILTER.
APPLICATION FILED FEB. 26, 1907.
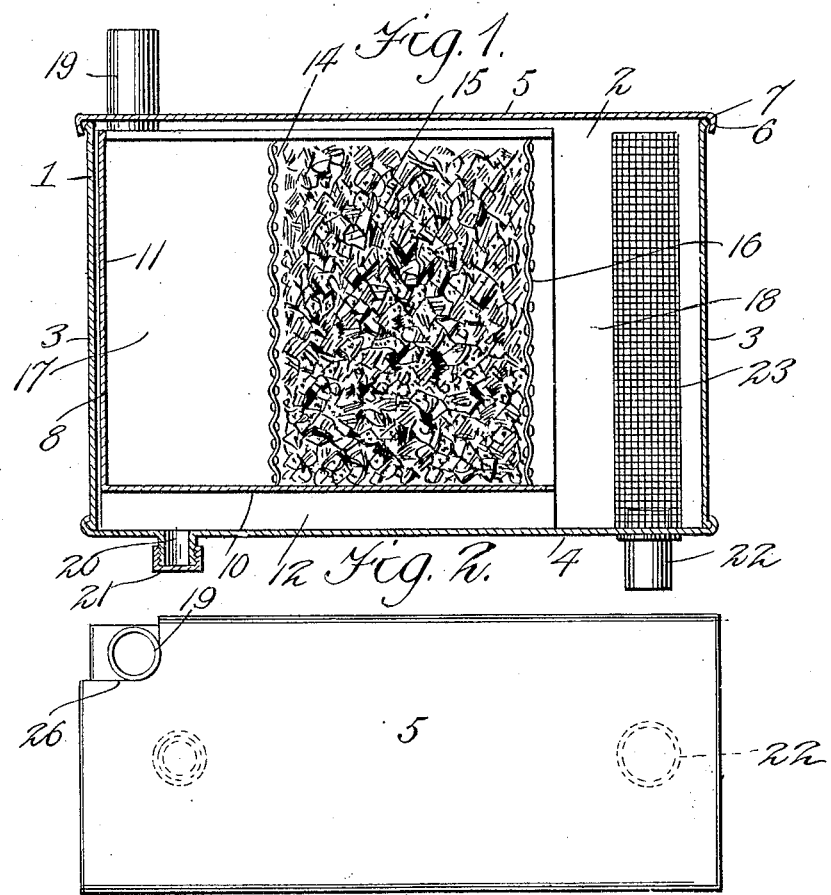
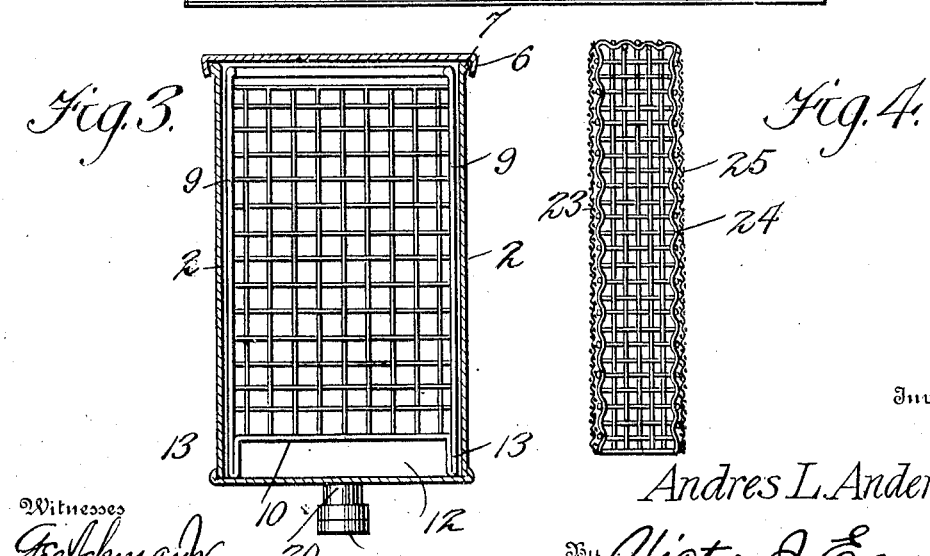
Witnesses
Inventor
Andres L. Anderson,
By Victor J. Evans
Attorney though still comparatively coarse grade, said body and sheath being held in spaced apart relation by the upper and lower heads 26 and 27, the former of which is closed and the latter of which is perforated or fashioned in the form of a ring or annulus to leave a central opening 28 to permit the tube to fit over the projecting end of the discharge pipe 22.

UNITED STATES PATENT OFFICE.

ANDERS L. ANDERSON, OF GAYVILLE, SOUTH DAKOTA.

FILTER.

No. 856,832.  Specification of Letters Patent.  Patented June 11, 1907.

Application filed February 26, 1907. Serial No. 359,372.

*To all whom it may concern:*

Be it known that I, ANDERS L. ANDERSON, a citizen of the United States, residing at Gayville, in the county of Yankton and State of South Dakota, have invented new and useful Improvements in Filters, of which the following is a specification.

This invention relates to filters designed especially for filtering the water from water sheds prior to its delivery into cisterns, and has for its objects to produce a comparatively simple, inexpensive device of this character, which may be readily installed for use, one whereby the water will be thoroughly filtered and purified, and one in which the filtering material may be conveniently renewed or cleaned from time to time as circumstances require.

A further object of the invention is to provide a device of this class in which the water will enter freely into the filter, one wherein the water will after passing through the filtering material be freely discharged, and one in which the sediments accumulating in the filter may be readily removed.

With these and other objects in view, the invention comprises the novel features of construction and combination of parts more fully hereinafter described.

In the accompanying drawings,—Figure 1 is a vertical longitudinal section taken centrally through a filter embodying the invention. Fig. 2 is a top plan view of the filter. Fig. 3 is a vertical transverse section thereof with the filtering material removed. Fig. 4 is a vertical section through the strainer tube or trap.

Referring to the drawing, 1 designates a filtering tank or vessel composed of sheet metal or other suitable material and comprising side walls 2, end walls 3, a bottom 4 and a removable cover 5, the latter being provided with a depending flange 6 adapted to engage a bead or rim 7 formed at the upper edges of the walls of the vessel.

Arranged within the vessel 1 is a removable filtering box 8, preferably formed of sheet metal, and comprising side walls 9, a bottom 10 and an end wall 11, said box being open at the top and at its opposite end, as shown. The box may be formed of a single piece of sheet metal bent into the described form, and the bottom 10 is preferably elevated to form a channel 12 between it and the bottom wall 4 of the vessel 1, the sheet metal being folded at the points of junction of the walls 9 and 10 to provide longitudinal side flanges or feet 13 resting on the wall 4 and supporting the box 8.

Disposed within the box 8 is a receptacle 14 designed to be filled with a charge of charcoal or other appropriate filtering material 15, said receptacle being formed by portions of the side walls 9 of the box in conjunction with end walls 16 of wire gauze or other reticulated fabric suitably held in position or fastened at its lower and side edges to the bottom and side walls of the box. The filtering receptacle 14 is disposed about centrally of the length of the tank 1, but closer to the open than to the closed end of the box, the end wall 11 of which latter bears against or is arranged closely adjacent to one of the end walls 3 of the tank, the box being of less length than the tank, so that the construction and arrangement described provides within one end of the box an inlet chamber or compartment 17 disposed between the head 11 and the adjacent partition 16 and an outlet chamber or compartment 18 located beyond the open end of the box and between the same and the opposite end wall 3 of the tank. Hence it will be seen that the compartments 17 and 18 are arranged on opposite sides of the body of filtering material, and that water entering compartment 17 must flow through the body of filtering material to the compartment 18, whereby the water on its passage through its filtering box is filtered.

Fixed to one of the upper corner portions of the tank 1 is an inlet pipe 19 arranged above the compartment 17 and designed to receive the end of a rain spout (not shown), and formed on or in the bottom wall 4 at the end of the tank below the said compartment 17 is a drain tube or port 20 communicating with the channel 12 and adapted to be closed by a screw cap 21. A discharge pipe 22 is secured to the wall 4 at the base of the compartment 18 and projects a short distance upwardly into said compartment to receive the lower end of a strainer tube or trap 23 extending vertically within said compartment and detachably fitted over the projecting end of said pipe, so that said tube may be conveniently removed when occasion requires, as in the operation of cleansing the filter. The trap or tube is preferably composed of a body 21 of stout wire gauze and an inclosing shield or sheath 25 of wire gauze of a finer weave or mesh, the stout wire of the body giving the required strength and rigidity, while the finer sieve-like sheath prevents the discharge of the fine washed-out particles of the filtering material with the purified water through the pipe 22. It will be observed that one of the corners of the cover 5 is cut away, as at 26, to form a recess to receive and accommodate the inlet pipe 19, so that the cover may be applied and removed without interference from said pipe.

In practice, the water enters the compartment 17 through the inlet 19 and percolates through the filtering material 15 into the compartment 18, whence it discharges through the screen trap or tube 23 and pipe 22, being thereby filtered and screened. The filter may be flushed for cleansing the tank of foreign particles without removing the box by closing the outlet 22 in any preferred manner and removing the cap 21 to allow the impurities to be washed out through the outlet 20. To cleanse the filter in a thorough manner, the cover 5 is removed, the strainer tube 23 then detached and withdrawn, and the box 8 then slipped endwise within the tank so as to clear the inlet pipe 19 and then removed from the open top of the tank, whereupon all the parts of the apparatus may be easily cleaned and the filtering material renewed, if required. It will be observed that the channel 12 forms a pocket or receptacle to receive and retain any and all foreign particles passing with the water through the body of filtering material, so that upon the removal of the parts above described the impurities may be washed out through the drain outlet 20. Upon removing the cap 21 from time to time accumulated impurities may be allowed to discharge to prevent the same from clogging the filter, thus obviating the necessity of cleansing the filter at short intervals.

Having thus described the invention, what is claimed as new, is:—

1. A filtering apparatus comprising a vessel having a top inlet and a bottom outlet arranged at the opposite ends of the same, a removable box within the vessel having a top inlet and open at one end, said box being shorter than the vessel and having its closed end arranged adjacent the inlet end of the receptacle, a filtering receptacle within the box arranged closer to the open than to the closed end thereof and forming within the box an inlet chamber and between the open end of the box and discharge end of the receptacle an outlet compartment, and a strainer covering the outlet in said outlet compartment.

2. In a device of the class described, a vessel provided with spaced guides, a receptacle positioned between the guides and having reticulated walls, a filtering material contained in the receptacle, said vessel being provided at one side of the receptacle with an inlet compartment and at the other side with a discharge compartment, an inlet port leading to the inlet compartment, a discharge port leading from the discharge compartment, a reticulated trap positioned in the latter over the discharge port, and a drain port leading from the vessel, said compartments being wholly closed against communication one with the other except through the receptacle.

3. A filtering apparatus comprising a vessel having a top inlet and a bottom outlet arranged at opposite ends of the same, a cover for closing the vessel, a removable box within the vessel open at top and one end, said box being shorter than the vessel and having its closed end arranged adjacent the inlet end of the receptacle, a filtering receptacle within the box arranged closer to the open than to the closed end thereof and forming within the box an inlet chamber and between the open end of the box and discharge end of the receptacle an outlet compartment, and a strainer tube communicating with the outlet and extending vertically within said outlet compartment.

4. A filtering apparatus comprising a vessel having an inlet, an outlet, inlet and outlet compartments respectively communicating therewith, a body of filtering material between said compartments, and a strainer tube extending up into the outlet compartment and communicating with the outlet, said tube comprising a body of coarse and a surrounding sheath of a finer mesh.

In testimony whereof, I affix my signature in presence of two witnesses.

ANDERS L. ANDERSON.

Witnesses:
W. H. McMaster,
L. N. Gaseth.